(12) United States Patent  
Davies et al.

(10) Patent No.: US 8,167,502 B2  
(45) Date of Patent: May 1, 2012

(54) STEERING COLUMN ASSEMBLY

(75) Inventors: Niclas Davies, Swansea (GB); Carl Thompson, Ludlow (GB)

(73) Assignee: TRW Limited, Solihull (GB)

( * ) Notice: Subject to any disclaimer, the term of this patent is extended or adjusted under 35 U.S.C. 154(b) by 677 days.

(21) Appl. No.: 12/259,802

(22) Filed: Oct. 28, 2008

(65) Prior Publication Data

US 2009/0145258 A1     Jun. 11, 2009

(30) Foreign Application Priority Data

Oct. 30, 2007   (GB) .................................. 0721238.4

(51) Int. Cl.
*F16C 33/36* (2006.01)

(52) U.S. Cl. ....................................................... 384/571

(58) Field of Classification Search .................... 74/492, 74/493; 280/775, 777
See application file for complete search history.

(56) References Cited

U.S. PATENT DOCUMENTS

| 4,507,982 A | 4/1985 | Turner et al. |
| 2004/0061322 A1 | 4/2004 | D'Agostino et al. |

FOREIGN PATENT DOCUMENTS

| EP | 1352806 A1 | 10/2003 |
| EP | 1464560 A2 * | 10/2004 |
| GB | 2451506 A | 2/2009 |
| JP | 2005001517 A | 1/2005 |

OTHER PUBLICATIONS

Search Report for GB0721238.4 dated Jan. 11, 2008.
Search Report for GB0819805.3 dated Feb. 25, 2009.

* cited by examiner

*Primary Examiner* — Thomas R Hannon
*Assistant Examiner* — Phillip A Johnson
(74) *Attorney, Agent, or Firm* — MacMillan, Sobanski & Todd, LLC

(57) ABSTRACT

A steering column assembly having an adjustable shroud comprises a fixed portion arranged to be secured to a body of a vehicle and a moving portion which can be moved telescopically relative to the fixed portion, a clamp mechanism which releasably fixes the moving portion in position relative the vehicle body, the clamp mechanism being movable between a first, unclamped, position in which the fixed portion and the moving portion can move relative to one another and a second, clamped, position in which the fixed portion and the moving portion are prevented from relative movement, and a lock mechanism, wherein the assembly is so arranged that when the clamp mechanism is in the first position the lock mechanism limits a range of movement of the moving portion relative to the fixed portion at least in a collapse direction by providing a path for collapse forces from the moving portion through the lock mechanism to the fixed portion, and when the clamp mechanism is in the second position the lock mechanism permits additional telescopic movement of the moving portion towards the fixed portion beyond the limited range of movement by removing the force path.

8 Claims, 4 Drawing Sheets

STEERING COLUMN ASSEMBLY

CROSS-REFERENCE TO RELATED APPLICATION

This application claims priority to Great Britain Patent Application No. 0721238.4 filed Oct. 30, 2007, the disclosures of which are incorporated herein by reference in entirety.

BACKGROUND OF THE INVENTION

This invention relates to steering column assemblies and in particular to steering column assemblies that are adjustable for reach.

It is known to provide steering columns that adjust for reach. Typically, they comprise a two part steering shaft that can be adjusted in length by one part telescoping over the other. To hold the shaft at the desired length it is known to provide a telescopic steering column shroud that comprises a fixed shroud portion that is secured to a part of the vehicle and a moving shroud portion that can move relative to the fixed part to vary the overall length of the shroud. Bearings within the shroud portions support the steering shaft whilst allowing it to rotate. Typically the two portions comprise tubes, one tube fitting within the other as they are collapsed together.

In use a releasable clamp mechanism secures the moving portion in the desired position relative to the fixed portion. In the clamped position the clamp mechanism prevents accidental adjust to the reach of the steering. In an unclamped, adjustment, position, it allows the moving portion to move so that the reach can be adjusted. What is claimed is:

The clamp mechanism typically acts between the moving shroud portion and a bracket that is fixed to a mount secure to the vehicle. The bracket, or at least part of it, could in fact be considered to form a part of the clamp mechanism. The shroud will therefore be fixed at two points, one connecting the fixed portion to the vehicle and the other connecting the moving portion to the vehicle through the bracket. A suitable clamp mechanism comprises a bracket having two dependent arms that are located to either side of a rail mounted on the moving portion. A clamp pin passes through an opening in one arm of the bracket, through openings in the rail and then through an opening in the other arm. One end of the clamp mechanism carries a fixed head and the other a cam that acts between a further fixed head and the arm of the bracket. The cam can be moved to squeeze the arms of the bracket onto the rail, clamping it in place. For reach adjustment the rail is provided with elongate slots through which the clamp pin passes. The length of the slot largely determines the limit of movement of the moving portion.

The bracket primarily locates the moving portion relative to the vehicle and the fixed portion when it is clamped. Most of the forces applied to the moving portion can therefore pass through the bracket to be reacted by the vehicle body. In the event of a crash, it is important that the moving portion can break free of the mount so that the moving portion is set free to telescope towards the fixed portion. This is typically achieved by providing one or more capsules between the bracket and the vehicle. In the event that a high force is applied to the moving portion, such as when a driver's torso strikes the steering wheel in a frontal impact, the capsules break allowing the bracket to break free of the vehicle. The moving portion is then free to collapse towards the fixed portion.

To aid in the absorption of the collapse force after the capsule has broken it is known to provide one or more energy absorbing devices that are deformed as the collapse continues beyond its normal range of adjustment. The deformation of the device absorbs the collapse energy in a controlled manner.

It is also desirable, but by no means essential, that clamping of the bracket to the rail may also simultaneously secure the moving portion to the fixed portion. The benefits of this would be to maximise the bending stiffness of the total column assembly in the clamped condition and to ensure that there is a predictable amount of sliding friction between the two portions, in the clamped condition, which can contribute a specified proportion of the total energy-absorbing crash force required during collapse.

A partial split in an outermost one of the two portions may be used to help ensure that the squeezing action of the cam-tensioned clamp bolt leads to effective Tube-to-Tube clamping simultaneously with the aforementioned clamping of the upper shroud portion to the said bracket.

As already stated the clamping mechanism in such a design, when not released, secures the upper portion to the bracket. The bracket is in turn rigidly attached to the vehicle by mechanically fusible connections (known as break Capsules) at all times, except in a crash. In a crash, the bracket moves slideably relative to the mount, the said capsules having been fractured by a proportion of the force of impact of the driver's torso on the steering wheel. The initial driver impact (or "breakaway") force has to overcome a combination of the capsule fracturing force, the Tube-to-Tube friction and sliding friction between the bracket and the mount.

Once the capsules have broken and the bracket has slid by a few millimeters relative to the mount, the energy absorbing member, perhaps an energy strap, may come into play as a partial means of controlling the force required to continue the telescopic collapsing of the column to the full limit of its stroke. The said Energy Strap may comprise a strip of metal that is attached to the bracket at one end and is shaped with a loop in such a way that it is progressively deformed, absorbing energy, by being dragged over an abutment on the mount during the telescopic collapsing of the column. Typically, the loop of the Energy Strap will have some initial clearance relative to the said abutment so that it does not contribute to the initial breakaway force.

The force which, in a crash, is required to act on the steering wheel in order for the column to telescopically collapse is usually specified to be much greater than the force which would realistically be applied to the wheel by a driver either in normal driving or when adjusting the position of the steering wheel. It is considered that some drivers could, in extremis, exert a sustained forward axial force of up 1500N on the wheel. Alternative, a shock load of up to 2500N could be realised if a driver rapidly adjusts the position of the upper column such that it impacts abruptly on the forward limit stop of the Reach adjustment travel.

A typical specification for crash-collapse force (as would be given by a vehicle manufacturer) would require that an axial force of approximately 6000N should be required to cause initial disconnection (breakaway) of the bracket from the mount in a crash and that a force of 2000N to 4000N would be required to cause collapse through the remainder of the telescopic travel.

However, with the type of Tube-in-Tube reach-Adjustment column described above (i.e. one having a partially split outer tube or other device for ensuring effective Tube-to-Tube clamping), it should be noted that the resistance to column collapse in crash is partly provided by the tube-to-tube friction. Typically, this tube-to-tube friction would be approximately 1500N. It should be noted that the contribution from tube-to-tube friction is not present while the column is unclamped for the purpose of adjusting the position of the steering wheel. Nevertheless, the remaining 4500N (i.e. 6000-1500) of breakaway resistance still present is ample to resist the potential "abuse" loads that a driver could inflict. (Note that the remaining 4500N of breakaway force derives from the strength of the said Capsules and from friction between the bracket and the mount.)

A problem may arise, though, if a vehicle manufacture specifies an unusually low breakaway force threshold; e.g. 3000N (in the clamped condition). In this event, the remaining breakaway resistance still present when the column is unclamped will only be 1500N (i.e. 3000-1500) and this will be insufficient to ensure that the Capsules are not fractured, and the crash stroke is not initiated, by abuse loads deriving from the driver during adjustment of the steering wheel.

In such a prior art design it may therefore possible for a load to be applied by a driver during adjustment that is great enough to cause damage to the steering column assembly. At best this may require a costly replacement at parts. At worst it may comprise the safety of the steering assembly and adversely affect its performance in a crash.

BRIEF SUMMARY OF THE INVENTION

It is a feature of the invention to at least partially ameliorate this problem in the prior art in relation to a steering column assembly of the kind set forth. Nevertheless, it should be understood that the invention also applies to other types of steering column assembly that permit reach adjustment.

According to a first aspect the invention provides a steering column assembly having an adjustable shroud comprising a fixed portion secured to the vehicle body and a moving portion which can be extended or collapsed telescopically relative to the fixed portion, a clamp mechanism which releasably fixes the moving portion in position relative the vehicle body, the clamp mechanism being movable between a first, unclamped, position in which the fixed portion and moving portion can move relative to one another and a second, clamped, position in which the fixed portion and moving portion are prevented from relative movement, and a lock mechanism, in which the assembly is so arranged that when the clamp mechanism is in its first position the lock mechanism limits the range of movement of the moving portion relative to the fixed portion at least in a collapse direction by providing a path for collapse forces from the moving portion through the lock mechanism to the fixed portion, and when the clamp mechanism is in its second position the lock mechanism permits additional telescopic movement of the moving portion towards the fixed portion beyond the limited range by removing that force path.

The lock mechanism therefore ensures that when the clamp mechanism is unlocked, the maximum allowed collapse is limited yet when the clamp mechanism is locked more collapse is possible. The force path from the moving portion through the clamp mechanism and lock to the fixed portion reacts any forces attempting to collapse the assembly beyond its desired range of travel. Yet, when clamped further collapse is allowed as may be desirable to bring into play various energy absorbing elements that help dissipate energy in an accident.

The lock mechanism, when the clamp mechanism is in its first position, may provide a mechanical lock connection between the moving portion and fixed portion through the lock mechanism.

The lock mechanism may comprise at least one movable tooth or movable stop which engages in a first slot in the fixed portion of the shroud and which is located within a second slot provided in the moving portion when the clamp mechanism is in the first position, and which tooth is free of the slots when the clamp mechanism is in the second position, the tooth striking the end of both of the slots at a point which corresponds to the desired limited range of movement of the assembly in the unclamped position during collapse.

The striking of the tooth on the ends of the slots provides the desired positive mechanical lock and sets up the path for reacting forces applied to the moving portion.

The moving portion may slide over the fixed portion, with either direct contact or through a spacer of low friction material. The slot in the fixed portion may therefore be relatively short, with the slot in the moving portion providing the required range of movement of the lock tooth during normal adjustment.

The clamp mechanism may comprise a U-shaped bracket having spaced arms that fit around a rail secured to the moving portion, each of the spaced arms of the bracket including an opening through which a clamp pin passes, the clamp pin also passing through at least one elongate slot in the rail and being free to move along the elongate slot when the clamp mechanism is in its first position and prevented from moving when in its second position.

The tooth of the lock mechanism may move along its slot in the moving portion of shroud such that, in use, as the clamp pin approaches the end of the slot in the rail that corresponds to the most collapsed position of the shroud within its allowable range, the tooth first strikes the end of its slot in the moving portion of shroud. Note that in this case, the tooth will approach the end of the slot nearest the steering wheel.

Alternatively, the clamp pin may pass through a slot in the bracket rather than the rail. This in effect gives the same functionality as putting the groove in the bracket with respect to reach adjustment.

The tooth may comprise a dog tooth so shaped that it is easy to release from its slots in the moving and fixed portions even if it is under load.

Part of the lock mechanism may form a part of the clamp mechanism. Most preferably the tooth of the lock mechanism is secured to, or forms a part of, the clamp pin. This works well where the clamp pin is rotated on movement of the clamp mechanism from the clamped to unclamped positions. Thus, as the clamp pin is rotated between its clamped and unclamped position the tooth may also rotate and so move between its disengaged and engaged positions relative to the slots.

When clamped, as described, the force path provided by the lock mechanism is removed. In a preferred arrangement, the only remaining path of force from the moving portion to the vehicle may be through the clamp mechanism and the bracket to the vehicle. Some force may pass from the moving portion to the fixed portion through friction between the two that is present when clamped. It is indeed preferable that this exists. Nevertheless a significant part of the force may pass through the bracket to the vehicle. The assembly may therefore include at least one weakening such as breakaway capsule that has a known break force. This allows the steering assembly to collapse during a crash beyond its normal limited range of adjustment.

Although not essential, it is preferred that the fixed and moving portions comprise cylindrical tubes with the moving shroud portion having a larger inner diameter than the outer diameter of the fixed portion, the moving portion collapsing telescopically over the fixed portion. A further slot may be provided in the outer tube that can close up on clamping of the clamp mechanism.

One or more crash elements may be provided that absorb the collapse force of the moving portion when it collapses beyond predetermined travel set by clamp mechanism. The crash elements may absorb force by deforming in the event of a crash. The or each element may comprise a crash strap that may be looped around one or more pegs attached to the fixed and/or moving portions. Importantly, the limited range of collapse allowed by the lock mechanism should be chosen such that the crash elements are not deformed during adjustment. They should only come into play in a crash that causes collapse beyond the normal range.

The shroud may support a steering shaft that can also telescope and has at least two parts. This may be supported relative to the shroud by bearings.

Other advantages of this invention will become apparent to those skilled in the art from the following detailed description of the preferred embodiment, when read in light of the accompanying drawings.

DETAILED DESCRIPTION OF THE INVENTION

Figure 1:
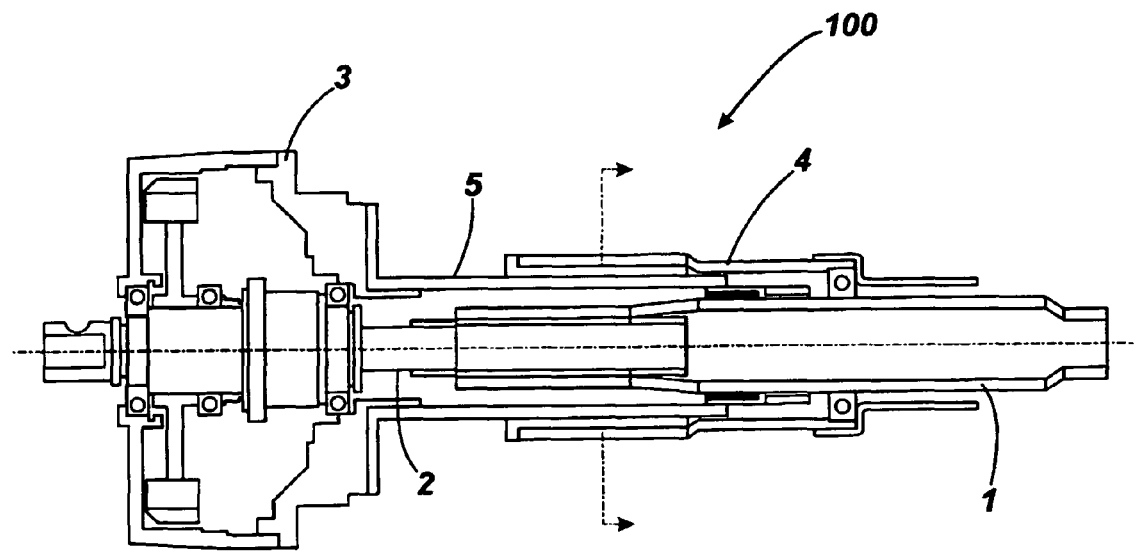
FIG. 1 is a cross sectional view of a part of an embodiment of a steering column assembly according to the present invention.

As shown in FIG. 1, a reach adjustable steering column assembly 100 comprises a two part steering shaft 1, 2 that is located by upper and lower bearings within a telescopic steering column shroud. The shaft 1, 2 connects a steering wheel (not shown) to a part of the steering gear. In the embodiment shown it in fact connects to the steering rack and a gearbox located within a gearbox housing 3 which provides power assistance.

The shroud comprises an upper shroud portion 4 and a lower shroud portion 5. Both portions are tubular, with the upper shroud portion in this embodiment having a larger internal diameter than the external diameter of the lower shroud portion 5. One end of the upper portion 4 is located concentrically around the top end of the lower shroud portion 5.

The lower shroud portion 5 is secured to the gearbox housing 3, which is in turn pivotally fixed to a rigid part of the vehicle body. This could, for example, be part of the vehicle bulkhead. The pivot axis lies in a horizontal plane orthogonal to the axis of the steering shaft. This allows the whole assembly to be adjusted up and down for rake angle.

Clearly, some way of fixing the upper shroud portion 4 in position relative to the lower shroud portion 5 is needed. This should be releasable so that the shroud can collapse and extend telescopically during an adjustment, yet be able to hold the upper portion securely when driving to stop the wheel moving unintentionally.

Figure 2:
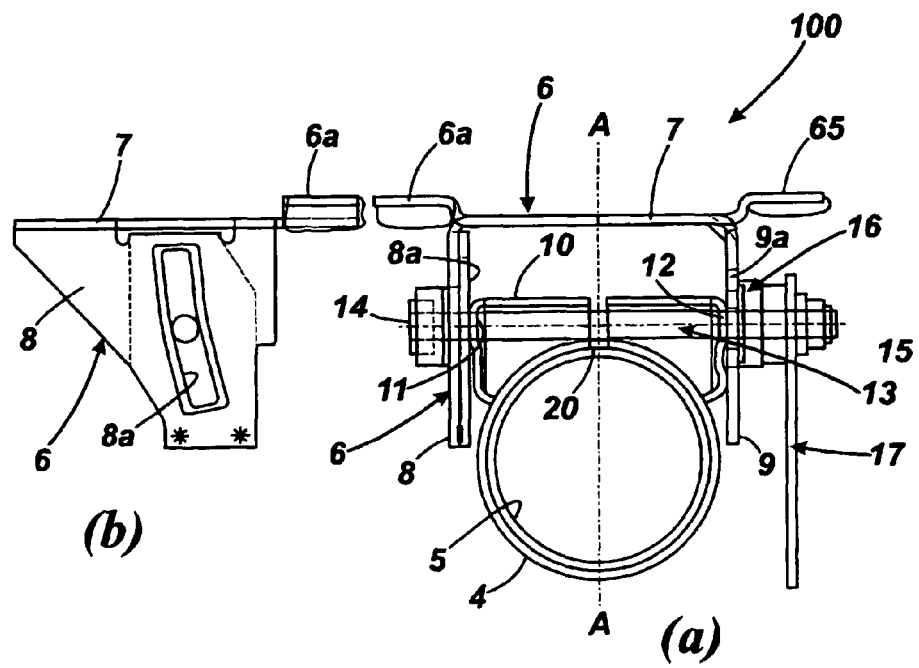
FIG. 2(a) shows the steering column assembly of FIG. 1 with the clamp mechanism in place as viewed along the section line A-A in FIG. 1 whilst 2(b) shows the bracket viewed from the side.
Figure 3:
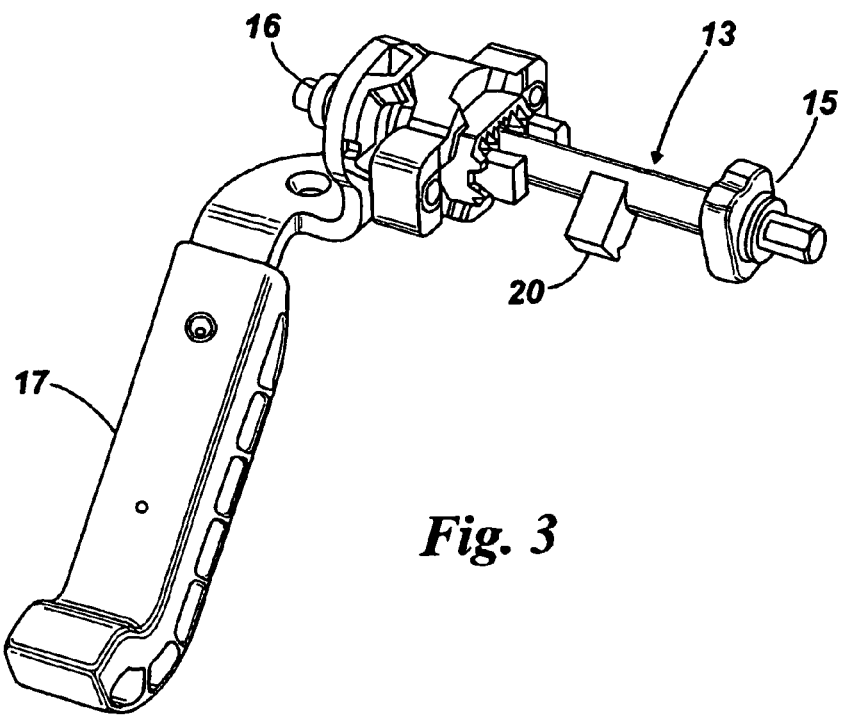
FIG. 3 shows the clamp mechanism in more detail including the location of a lock tooth that forms part of its lock mechanism.

To hold the upper shroud portion 4 in place, a releasable clamp mechanism is provided which secures the upper shroud portion 4 to a bracket 6. The bracket 6, in turn, is secured to the vehicle body through a breakable capsule or capsules 6a, 6b. This clamp mechanism with bracket is shown in FIG. 2 (it is omitted from FIG. 1). A detailed view of a part of the clamp mechanism is provided in FIG. 3.

The bracket 6 comprises base portion 7 and two spaced apart arms 8, 9 that depend from the base portion. The arms 8, 9 and base 7 together form an inverted U-shape, defining a region between the arms. A rail 10 of box section having side and top walls is secured to the top face of the upper shroud portion, the width of the box section being roughly equal to the spacing between the arms. The top wall is actually split along its entire length. Each of the arms 8, 9 of the bracket is provided with a generally vertically extending slot 8a, 9a. The side walls of the rail 10 are also provided with slots 11,12 but instead of extending generally vertically they extend generally parallel to the axis along which the shroud telescopes. The rail 10 is located between the arms of the bracket and a clamp pin 13 passes through the slots in the arms and rails. The moving portion can therefore hang from the pin 13 that hangs from the bracket.

The slots 8a, 9a allow the pin 13 to move up and down relative to the bracket 6 that in turn causes the upper shroud portion 4 to move up and down giving rake adjustment. The slots 11, 12 in the rail 10 allows the upper shroud portion 4 to move giving reach adjustment.

Each end of the clamp pin 13 is provided with a fixed head 14, 15 outside of the bracket, and between one of the fixed heads 15 and an arm 9 of the bracket 6 is a cam mechanism 16 operated by a lever 17. The cam mechanism comprises a fixed cam part that is fixed to the clamp pin so that it rotates with the pin. This part is also fixed to the lever. The cam mechanism also includes a follower that is fixed so that it cannot rotate. As the cam is rotated one way by the lever it causes the overall width of the cam mechanism (measured along the axis of the pin) to increase. Rotating the cam the other way decreases its width. The effect of the cam mechanism is that as the width increases the arms of the bracket are squeezed onto the sides of the rail. This action secures the rail and hence the upper shroud portion in place.

A slot in the top of the upper shroud portion 4 is also provided, which lies between the sides of the rail 10. This slot helps the upper shroud portion squeeze onto the lower shroud portion and the rail is squeezed helping to remove any free play between the upper and lower shroud portions.

In use, the lever 17 can be rotated to place the clamp mechanism in the unclamped state, allowing the clamp pin 13 to move along the slots. It can then be rotated to move the clamp mechanism to its clamped position locking the assembly in place.

In the event of a crash where a high load axial load is applied to the steering shaft through the wheel, the force will initially travel along a path through the clamp pin 13 and bracket 6 to the vehicle. If this force is very large, it may cause the capsules 6a, 6b to break. When this happens, the upper portion 4 becomes free to telescope towards the lower shroud portion 5. A crash strap (not shown) wrapped around the upper and lower portions can then deform to resist this collapse, absorbing the collapse force in a controlled manner.

Without the breaking capsule, the bracket may prevent any movement at all of the upper shroud that could lead to injury of the driver.

Figure 6:
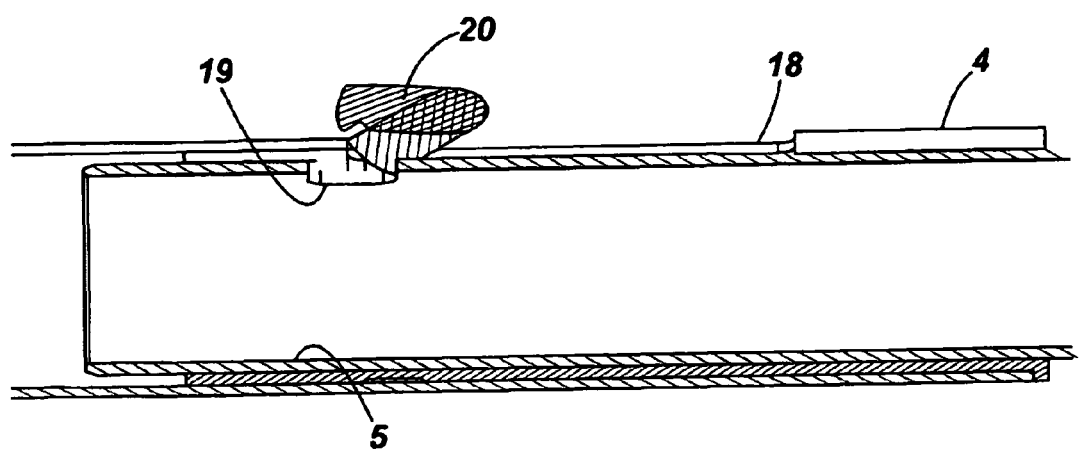
FIG. 6 is a cross section showing the tubes and the lock tooth, other parts being removed, to illustrate the location of the lock tooth relative to the slots when the clamp mechanism is unclamped (solid lines) and clamped (dotted lines).
Figure 4:
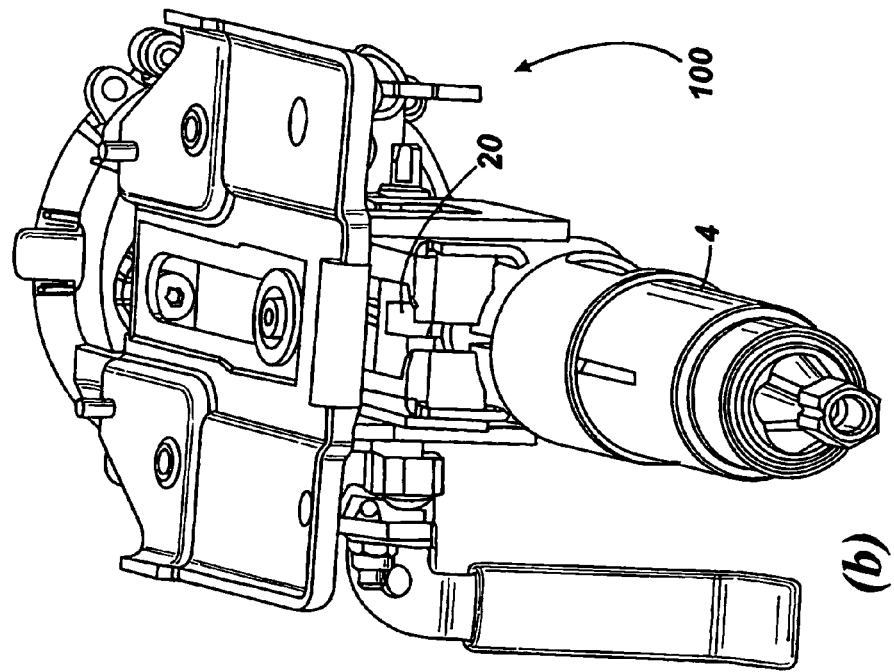
FIG. 4 shows in isometric view the embodiment in accordance with the present invention in (a) a clamped state and (b) and unclamped state.
Figure 4:
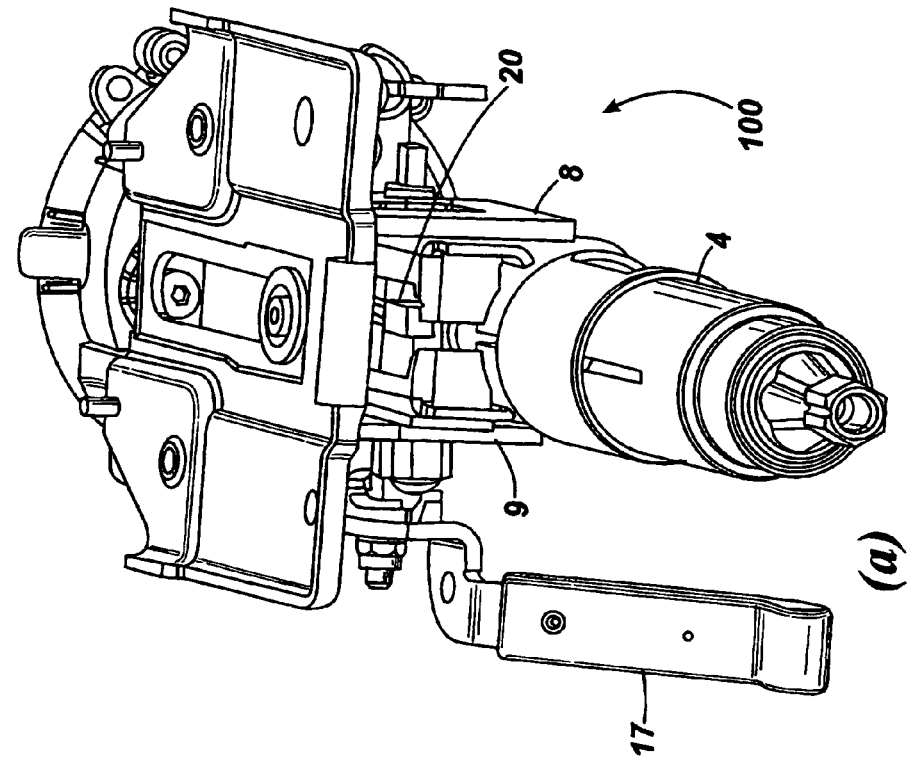

The embodiment as described so far is as known from the prior art. Where it differs significantly is in the provision of an additional lock mechanism that helps to prevent damage during adjustment. This lock mechanism and its function will now be described in detail with reference to FIGS. 4, 5 and 6 of the accompanying drawings.

The clamp pin 13 carries a lock tooth 20 at its centre that protrudes orthogonally from the pin 13 and so rotates with the clamp pin 13. For strength this is an integral part of the pin that can be cast or stamped during manufacture. This tooth 20 forms a part of the lock mechanism. The clamp pin 13 can be considered to also be part of the lock mechanism, as well as being part of the clamp mechanism, in that it provides actuation of the lock mechanism. This is significant since it is important that the state of the lock mechanism (locked/unlocked) is tied in with the state of the clamp mechanism (unclamped/clamped).

Figure 5:
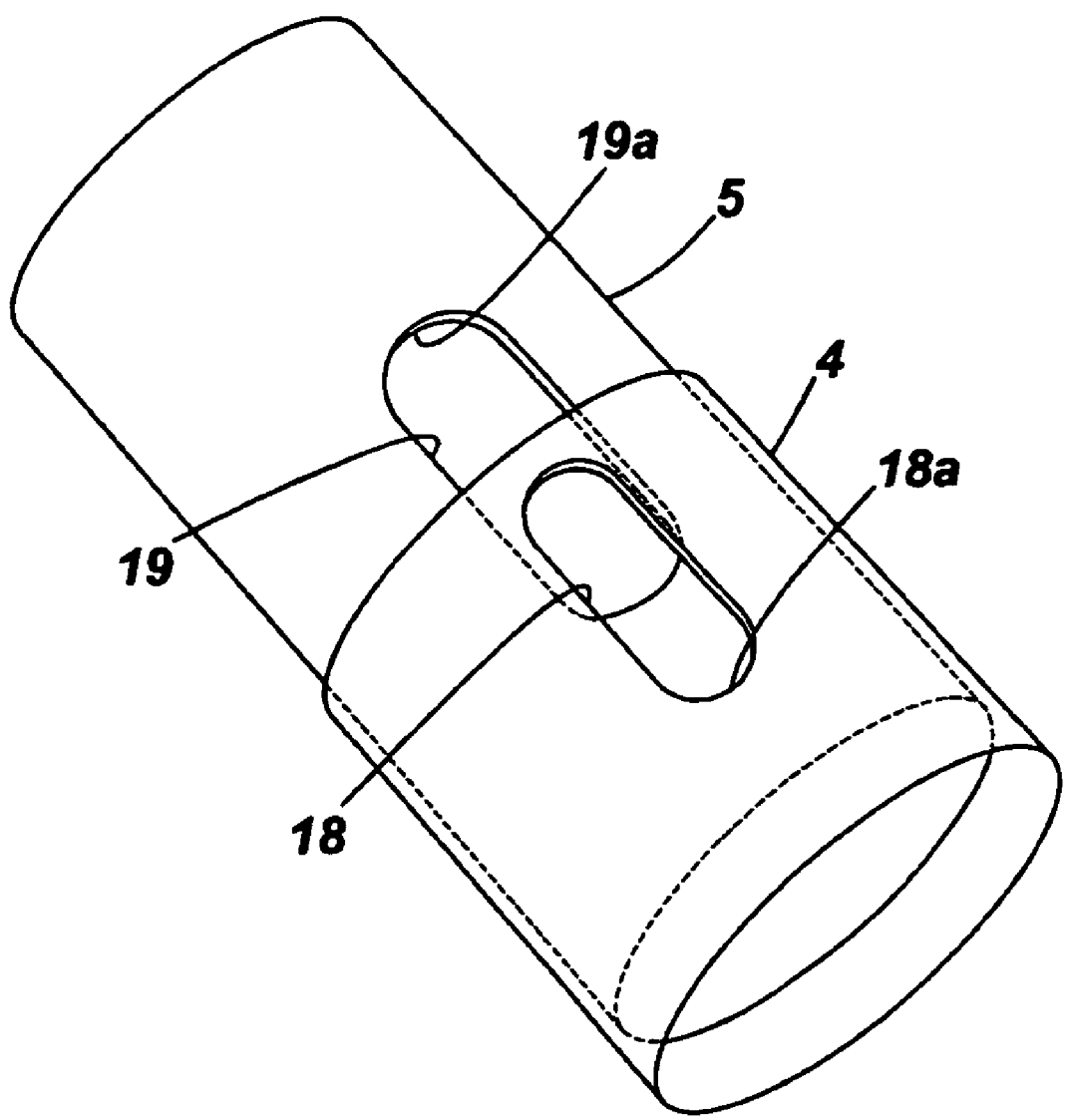
FIG. 5 is an isometric partial view of the tubes with the slots that form part of the lock mechanism (perspective view) with the clamp mechanism removed for clarity.

As shown in FIG. 5, the upper shroud portion 4 is provided with an elongate slot 18 that lies directly below the clamp pin 13 during a normal range of movement. The slot 18 runs parallel to the axis of the steering column. The ends of the slot 18 correspond roughly with the position of the ends of the slots 11, 12 in the rail 10. In fact, it is preferred that this slot 18 is slightly shorter than the slot in the rail. As will become apparent, the location of the ends of this slot will at least partially determine the normal limit of adjustment of the assembly. The slot 18 lies directly in line with the lock tooth 20 so that the plane in which the tooth 20 moves is aligned with the centre line of the slot. These slots also form part of the lock mechanism.

When the clamp mechanism is in the unclamped position, the tooth 20 of the lock mechanism is held clear of the slot 18. When it is in the unclamped position it is located in this slot 18.

The inner shroud portion 5 also carries a slot or hole 19, somewhat shorter than that in the upper shroud portion 4. This slot 19 is aligned with the one in the upper shroud portion 4 so it is visible through that slot. The function of this slot 19 is to provide a keep into which the lock tooth 20 projects when the clamp mechanism is in the unclamped position. When the tooth 20 is located in this keep it mechanically locks the lower shroud portion to the upper shroud portion through the clamp pin 13.

In use, as the reach is adjusted, the clamp pin 13 will move along the slot in the rail 10. At the same time, the lock tooth 20 will move along the slot 18 in the upper shroud portion. Note that no relative movement between the clamp mechanism and lower shroud portion is possible in this embodiment due to a snug fit of the lock tooth in its keep.

When moving to the most collapsed position, just prior to the clamp pin striking the end of the slot in the rail, or substantially at the same time, the lock tooth 20 will strike the end 18a of the slot 18 in the upper shroud portion and also the opposing end 19a of the slot 19 in the lower shroud portion 5. The lock mechanism therefore limits the range of travel by providing an earth path from the moving portion, through the clamp pin, to the fixed shroud portion. The slots in the rail 10 simply provide the function of controlling the path along which the upper portion can move rather than limiting its range of collapse in normal adjustment.

Hence, when fully moved to its most telescopically collapsed position, an earth path exists for forces applied to the upper shroud portion, through the rail, the end of the slot, the clamp pin and the lock tooth into the fixed portion and hence the vehicle body. Without this, the only earth path is from the clamp pin through the slot in the bracket and the breakaway capsules to the vehicle.

Providing the additional earth path ensures that excess force does not pass through the bracket causing the capsules to break during a clumsy adjustment of the reach of the wheel. This can allow otherwise unacceptably low breakaway forces to be present with the capsules.

When in the clamped position, the lock tooth 20 is moved out of its keep. The force path from the clamp pin 13 through the lock tooth 20 to the fixed portion 5 is therefore removed. The moving portion 4 is primarily prevented from moving by a force path through the bracket and its breakaway capsule to the vehicle and also any friction between the two shroud portions. If sufficient force is applied to break the capsule, the steering assembly can collapse further. With the lock removed, the steering assembly therefore functions in the same manner as a prior art steering assembly of this type.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A steering column assembly having an adjustable shroud comprising a fixed portion arranged to be secured to a body of a vehicle and a moving portion which can be moved telescopically relative to said fixed portion, a clamp mechanism which releasably fixes said moving portion in position relative said vehicle body, said clamp mechanism being movable between a first, unclamped, position in which said fixed portion and said moving portion can move relative to one another and a second, clamped, position in which said fixed portion and said moving portion are prevented from relative movement, and a lock mechanism, wherein said assembly is so arranged that when said clamp mechanism is in said first, unclamped, position said lock mechanism limits a range of movement of said moving portion relative to the fixed portion at least in a collapse direction by providing a path for collapse forces from said moving portion through said lock mechanism to said fixed portion, and when said clamp mechanism is in said second, clamped, position said lock mechanism permits additional telescopic movement of said moving portion towards said fixed portion beyond said limited range of movement by removing said force path; and wherein said lock mechanism comprises at least one movable tooth which engages in a first slot in said fixed portion of said shroud and which is located within a second slot provided in said moving portion when said clamp mechanism is in said first, unclamped, position, and which tooth is free of said slots when said clamp mechanism is in said second, clamped, position, said tooth striking an end of both of said slots at a point which corresponds to said limited range of movement of said assembly in said unclamped position during collapse.

2. A steering column assembly according to claim 1 wherein said lock mechanism, when said clamp mechanism is in said first, unclamped, position, provides a mechanical lock connection between said moving portion and said fixed portion.

3. A steering column assembly according to any claim 1 wherein said moving portion slides over said fixed portion.

4. A steering column assembly according to claim 1 wherein said clamp mechanism comprises a U-shaped bracket having spaced arms that fit around a rail secured to said moving portion, each of said spaced arms of said bracket including an opening through which a clamp pin passes, said clamp pin also passing through at least one elongate slot in said rail and being free to move along said elongate slot when said clamp mechanism is in said first, unclamped, position and prevented from moving when said clamp mechanism is in said second, clamped, position.

5. A steering assembly according to claim 4 wherein said tooth of said lock mechanism is able to move along said second slot in said moving portion of shroud such that, in use, as said clamp pin approaches an end of said elongate slot in said rail that corresponds to a most collapsed position of said shroud within said limited range, said tooth first strikes the end of said second slot in the moving portion of shroud.

6. A steering assembly according to claim 1 wherein said movable tooth comprises a dog tooth.

7. A steering assembly according to claim 1 wherein said tooth of said lock mechanism is secured to said clamp pin.

8. A steering assembly according to claim 1 which includes at least one crash element that absorbs said collapse force of said moving portion when it collapses beyond said limited range allowed by said lock mechanism during adjustment.

* * * * *